United States Patent [19]

Bryant

[11] 4,248,033
[45] Feb. 3, 1981

[54] THRU-FLOW AQUATIC HARVESTER

[76] Inventor: Charles B. Bryant, N67 W32380, Wildwood Point Rd., Hartland, Wis. 53029

[21] Appl. No.: 17,982

[22] Filed: Mar. 7, 1979

[51] Int. Cl.³ .......................................... A01D 44/00
[52] U.S. Cl. ............................................... 56/8; 56/9
[58] Field of Search ................ 56/8, 9, 16.6; 37/57; 119/3

[56] References Cited

U.S. PATENT DOCUMENTS

| | | | |
|---|---|---|---|
| 319,352 | 6/1885 | Trahern | 56/8 |
| 1,120,206 | 12/1914 | Knapp | 56/8 |
| 2,747,356 | 5/1956 | Peterson | 56/16.6 |
| 3,084,309 | 4/1963 | Wiegardt, Jr. | 56/8 |
| 3,374,770 | 3/1968 | Freudenberger | 119/3 |
| 3,833,119 | 9/1974 | Brown | 119/3 |

FOREIGN PATENT DOCUMENTS 1493565  9/1967  France .......................................... 56/8

*Primary Examiner*—Paul J. Hirsch
*Attorney, Agent, or Firm*—Henry C. Fuller

[57] ABSTRACT

Aquatic harvesting apparatus employs a harvesting barge with vertical and horizontal weed cutters and a tunnel extending from the cutting throat through the entire length of the harvesting barge for discharge of the cut weeds into a collection container coupled to the stern. The cut vegetation is not elevated from the water during this procedure. The collection container is paneled with mesh and has a gate which can be opened to receive the weeds and closed to seal the container. The container can be towed to shore or elevated by a crane.

2 Claims, 3 Drawing Figures

THRU-FLOW AQUATIC HARVESTER

BACKGROUND OF THE INVENTION

The invention relates to a method and apparatus for harvesting aquatic vegetation. Prior art techniques and apparatus for harvesting vegetation typically employed a harvesting barge which elevated the vegetation from the water with a conveyor which extended below the water line adjacent the cutting head. The harvested vegetation was either unloaded into a transport barge or discharged onto the shore. A centrifugal hurling machine as illustrated in my prior U.S. Pat. No. 3,688,478 could be used for shore discharge. Alternatively, a shore conveyor as illustrated in my U.S. Pat. No. 3,653,192 could be employed. The apparatus shown in these patents involves elevating the aquatic vegetation out of the water at the harvesting site and requires the use of expensive conveyors and power equipment therefor.

The harvesting apparatus of the invention is suitable for harvesting a wide variety of aquatic vegetation which is either floating or located near the water surface. When using a number of collection-transport containers, large quantities of aquatic vegetation such as macrocystis (Kelp) can be harvested with relatively inexpensive apparatus.

SUMMARY OF THE INVENTION

The invention relates to a method and apparatus for harvesting aquatic vegetation without elevating the vegetation out of the water at the harvesting site. In this regard, the harvesting barge is provided with a forwardly located cutting assembly with vertical side cutters and a horizontal cutter. The vertical cutters are supported on converging wings which form a weed collection throat. A weed transfer tunnel extending through the harvesting barge and aft of the cutting assembly conveys the cut vegetation through the barge into a collection and transport container. The container is foraminous to permit movement through the water in an unloaded condition and to afford drainage of the water from the weeds if the containers are lifted from the water by a crane. The containers are provided with couplings to couple to the stern of the harvest barge. The containers have a gate which, when raised, permits entry of the vegetation from the tunnel of the harvest barge. The transport container is floated by pontoons or floats, and the floor is below the water level so that no elevation of the weeds is required as with the apparatus and methods disclosed in my prior patents cited above. Filled transport containers are decoupled and towed or pushed to the shore discharge site by a tugboat, or the containers can be elevated from the water with a transport barge and crane.

The harvesting barge can be in the form of a pontoon boat with spaced rectangular shaped pontoons below the water level to form the sides of the tunnel. Propulsion means are provided for the harvest barge to propel the harvesting barge and the coupled transport container into the weeds and permit relative movement between the weeds and the barges so that the weeds move through the tunnel, the gate and into the transport vessel. The propulsion means is desirably located on the sides of the barge to avoid interference with the tunnel. Paddle wheels or the like are suitable for harvesting in relatively shallow water.

Further objects, advantages and features of the invention will be apparent from the disclosure.

DESCRIPTION OF THE PREFERRED EMBODIMENT

Figure 1:
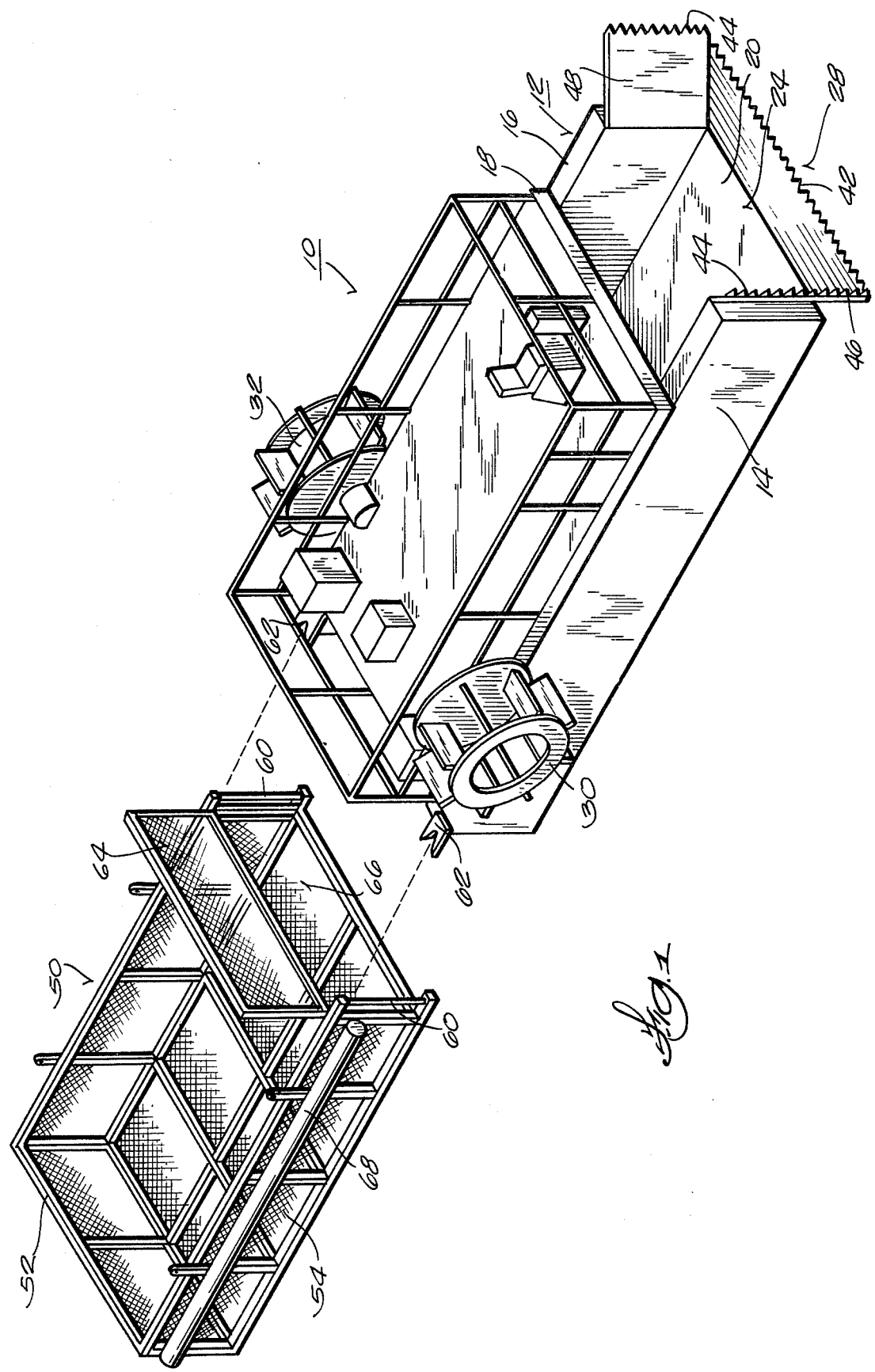
FIG. 1 is a perspective view of a harvesting barge and transport barge in accordance with the invention.

Although the disclosure hereof is detailed and exact to enable those skilled in the art to practice the invention, the physical embodiments herein disclosed merely exemplify the invention which may be embodied in other specific structure. The scope of the invention is defined in the claims appended hereto.

The harvesting barge 10 includes a frame 12 including floats 14 and 16 which are interconnected by an upper platform 18 and a floor 20. The floats 14, 16 can be fabricated from sheet metal and be rectangular in cross-section. Floats 1 foot thick and 4 feet deep may be appropriate in size.

The floats 14, 16, platform 18 and the floor 20 define a weed transfer tunnel 24 for movement of weeds from the front of the barge into a collection and transport container hereinafter described in detail.

At the forward end of the tunnel 24 is a conventional weed cutting assembly 28 which includes a horizontal cutter 42 and vertical cutters 44. The vertical cutters can be on converging wings 46, 48 which enable a wide swath of weeds to be harvested and form a collection throat for the tunnel.

Propulsion means are provided to move the harvesting barge through the water. In the disclosed construction, the barge is provided with paddle wheels 30 and 32 which permit movement of the harvesting barge in relatively shallow water. The use of paddle wheels on the sides of the harvesting barge 10 also eliminates any interference with the collection and transport containers which are closely coupled to the stern of the harvesting barge 10.

The weeds moving through the tunnel 36 are collected in a floating collection and transport container 50 which is desirably foraminous to permit water flow through the walls. In the disclosed construction, the sides and bottom of the frame 52 are enclosed or paneled by mesh or screening 54 to afford separation of water from the vegetation and permit transport of the containers 50 through the water. Means are provided for quick coupling and decoupling of the containers 50 to the transport barge. In this regard, the coupling posts 60 cooperate with couplings 62 on the harvesting barge.

The containers 50 are also provided with vertically movable gates 64. In FIG. 1, the gate 64 is in the open position, permitting entry of vegetation from the tunnel 24 through the opening 66. The containers 50 are supported by floats or pontoons 68.

Figure 2:
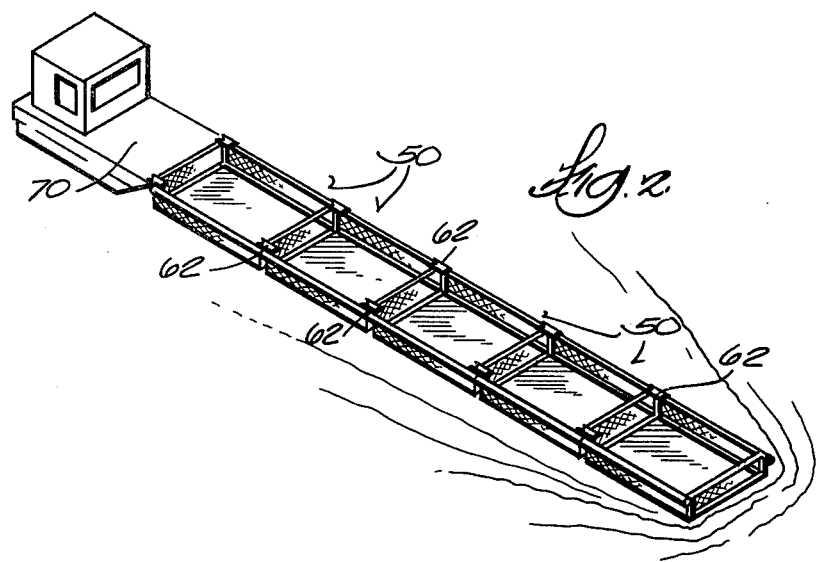
FIG. 2 is a perspective view of a series of collection barges coupled together in tandem.
Figure 3:
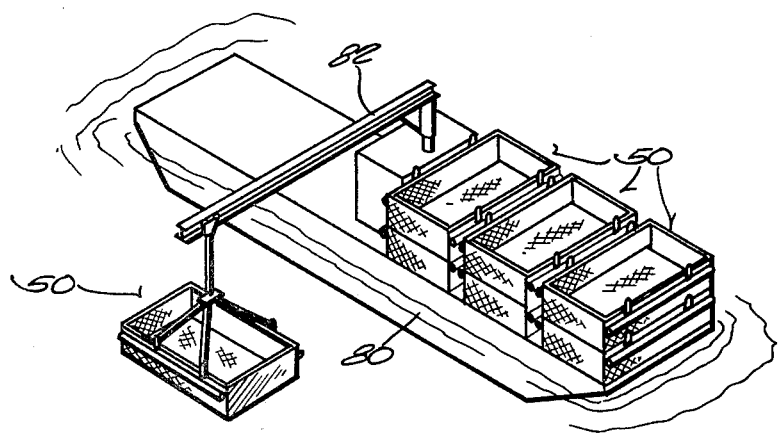
FIG. 3 is a perspective view of an alternate method of transporting collected vegetation.

FIG. 2 shows a pusher boat 70 manipulating a series of tandem connected loaded containers 50 to a shore unloading facility. After a container is filled and the gate 64 closed, the container 50 is decoupled from the harvesting barge and floats free or is anchored until picked up by a boat. Alternatively, as shown in FIG. 3, the containers may be lifted by a vessel 80 provided with a crane 82. During the lifting of the container, the water drains through the mesh and, hence, separates the weeds from the water to minimize the load.

The apparatus of the invention is inexpensive to manufacture because of the elimination of elevating conveyors shown in my prior art patents and minimizes the energy required to elevate the vegetation before discharge into a transport barge.

What is claimed is:

1. A method of harvesting aquatic vegetation comprising the steps of providing a harvest vessel with a through tunnel extending fore and aft and above and below the water line, and with converging wings defining a collection throat, providing a transport and collection barge having flotation means to independently float the barge, said barge having a rigid frame and foraminous walls with a fill opening and gate therefor, coupling the transport and collection barge to the harvest vessel with the fill opening in line with the tunnel and causing relative movement between the vegetation and the harvest vessel to cause compacted vegetation to move in line through the tunnel and into the collection barge without elevating the vegetation from the water and when the collection barge is filled to set it free and connect a second collection barge to the tunnel and repeating the foregoing steps.

2. The method of claim 1 including the subsequent step of coupling the collection barge to a vessel for movement to a disposal site.

* * * * *